Figure 1:
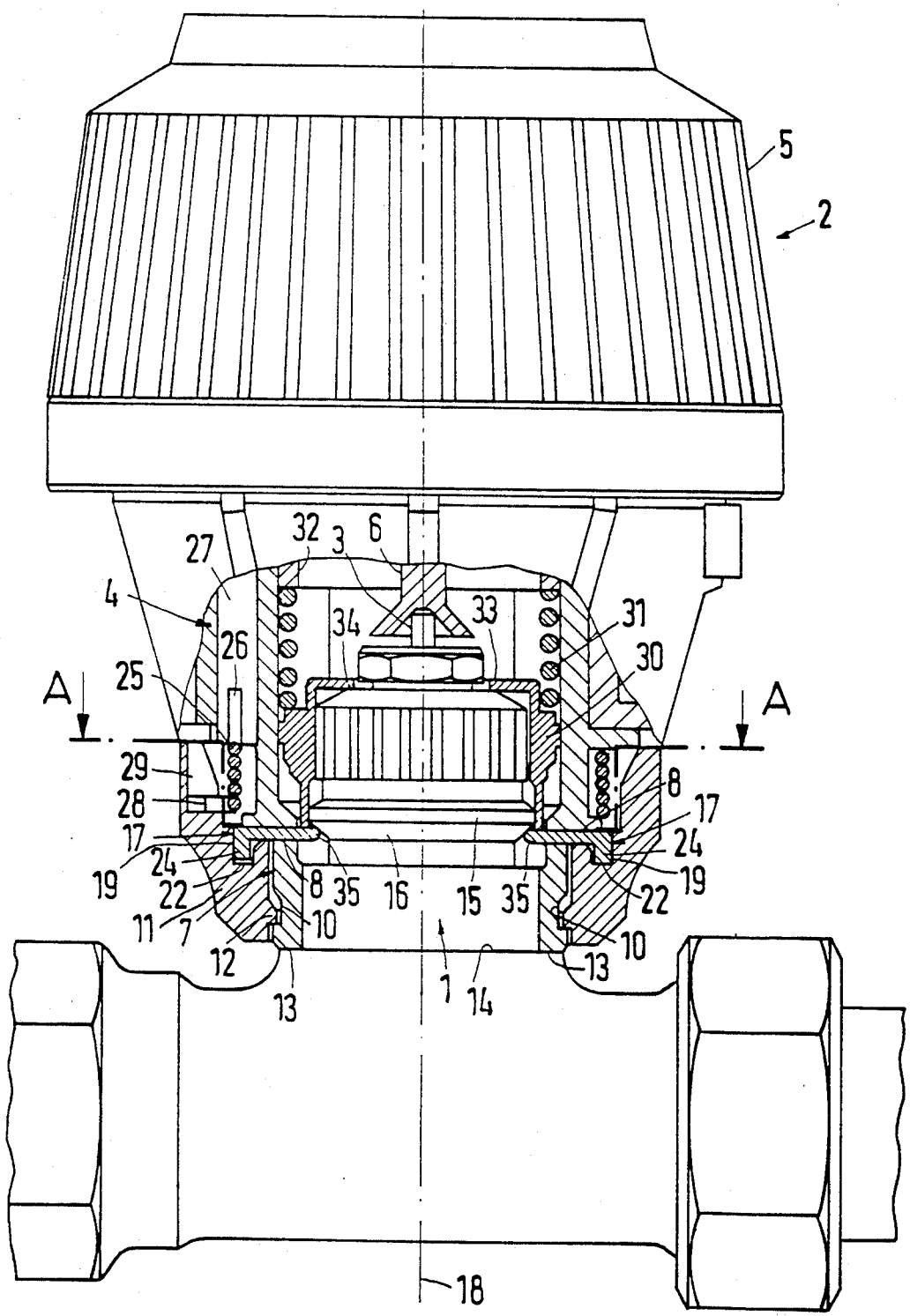

United States Patent [19]

Hansen et al.

[11] Patent Number: 5,143,286
[45] Date of Patent: Sep. 1, 1992

[54] THERMOSTATIC VALVE

[75] Inventors: Henning B. Hansen, Silkeborg; Stefan P. Maroti, Holstebro; Bjarne Frederiksen; Knud Lykkegaard, both of Silkeborg, all of Denmark

[73] Assignee: Danfoss A/S, Nordborg, Denmark

[21] Appl. No.: 796,864

[22] Filed: Nov. 25, 1991

[30] Foreign Application Priority Data

Nov. 30, 1990 [DE] Fed. Rep. of Germany ....... 4038141

[51] Int. Cl.$^5$ .............................................. F24F 11/06
[52] U.S. Cl. .................................. 236/42; 236/99 R; 285/314
[58] Field of Search .......................... 236/42, 43, 99 R; 285/81, 314, 317, 394, 395; 403/325, 350, 351

[56] References Cited

U.S. PATENT DOCUMENTS

| | | | |
|---|---|---|---|
| 3,351,359 | 11/1967 | Ferraris | 285/314 X |
| 3,411,813 | 11/1968 | Kreuz | 285/394 X |
| 3,438,574 | 4/1969 | Kilbar | 236/42 |
| 4,089,461 | 5/1978 | Gocke | 236/42 |
| 4,176,786 | 12/1979 | Braukmann | 236/42 X |
| 4,232,817 | 11/1980 | Braukmann et al. | 236/42 |
| 4,508,262 | 4/1985 | Pederson et al. | 236/42 |
| 4,508,263 | 4/1985 | Pederson et al. | 236/42 |
| 4,632,437 | 12/1986 | Robson et al. | 285/314 X |
| 4,739,793 | 4/1988 | Vollmer | 236/42 X |

Primary Examiner—William E. Tapolcai
Attorney, Agent, or Firm—Wayne B. Easton; Clayton R. Johnson

[57] ABSTRACT

A thermostat top part is mounted to a valve housing for rotation relative thereto and is axially removably secured thereto. The thermostat top part has a retaining ring surrounding and rotatable relative to a hollow cylindrical base foot. A clamping element is mounted by the base foot for radial movement between a position abutting against a clamping face of the valve housing that is tapered axially toward the housing abutment face in a radial inward direction for retaining the top part on the valve housing and a radial outward position permitting the thermostat top part being axially removed from the valve housing. A torsion spring resiliently urges the retainer ring to rotate in a direction for moving the clamping element radially inwardly. A locking ring in the base foot is moved axially against spring action from a first axial position retaining the clamping element it is radial outer position as the base foot is pushed onto the valve housing axially toward the abutment face and is moved out of the path of movement of the clamping element prior to the base foot abutting against the abutment face.

11 Claims, 3 Drawing Sheets

THERMOSTATIC VALVE

The invention relates to a thermostatic valve having a valve housing, a thermostat top part, the hollow-cylindrical base foot of which is surrounded by a retaining ring, which is secured axially and is rotatable relative to the base foot, which top part is arranged to be pushed axially onto the valve housing until the end face of the base foot engages an abutment face of the valve housing, the thermostatic valve also having a tapering clamping face on the valve housing and at least one clamping element that is radially adjustable in the retaining ring to bear against the clamping face and the abutment face.

In a known thermostatic valve of this kind, (DE 32 36 32 C2), the clamping element is a polygonal socket-head locking screw which is screwed through a threaded bore in the retaining ring and with a tapering face at its tip is pressed against the tapering clamping face on the valve housing, so that the end face of the base foot lies fixedly against the abutment face of the valve housing. Because of the considerable temperature fluctuations in the thermostatic valve, however, there can be no guarantee that the end face of the base foot will bear constantly and firmly against the abutment face of the valve housing, since the materials become deformed (expand and contract), and permanent deformations occur in particular when the base foot is made of plastics material. This in turn impairs the accuracy of the temperature control. The locking screw therefore has to be tightened occasionally, and the operating personnel frequently tend to exert too great a clamping force so that the tapering clamping face on the valve housing is damaged and/or the key with a multiple-cornered external head used for tightening is bent.

The invention is based on the problem of producing a thermostatic valve of the kind mentioned in the preamble, in which a constantly fixed seat of the thermostat top part on the valve housing is guaranteed and damage to the tapering clamping face is avoided.

According to the invention, this problem is solved in that the retaining ring has a guide face surrounding its centre line at least for a part of its circumference, the spacing of which guide face from the centre line increases from one end of the guide face to the other end lying in a radial plane, the clamping element bears against the guide face and on rotation of the retaining ring is radially displaceable while bearing against the guide face, the retaining ring is rotatable against the force of a first spring for the purpose of disconnecting the clamping element from the clamping face, and a locking ring surrounds the valve housing in the base foot and as the base foot is pushed onto the valve housing the locking ring is arranged to be displaced against the force of a second spring axially from a first end position, in which the clamping element bears against the circumference of the locking ring, into a second end position, beyond the path of movement of the clamping element.

In this solution to the problem, the thermostat top part and the valve housing are held fixedly together by the force of the first spring, regardless of temperature fluctuations and material deformations. Damage to the clamping face is avoided, because the retaining ring and thus the clamping element are stressed only by the force of the first spring, which can be selected corresponding to the permissible extent to which a load can be applied to the clamping face.

Preferably, provision is made for the guide face to define a guide groove, in which the clamping element engages, and for the guide groove to have parallel to the guide face a second guide face. A guide groove of this kind enables the clamping element to be adjusted in a simple manner in both radial directions without optionally-provided additional restoring springs which act directly on the clamping element.

The guide groove can be formed in an end face of the retaining ring, the clamping element being able to engage in the guide groove with a lateral projection. This means that the guide groove need not be undercut and the clamping element can be of simple shape.

The first spring may be a torsion spring, which is secured at one end to the base foot and at the other end to the retaining ring. A torsion spring of this kind is able to exert a uniform torque on the retaining ring.

Furthermore, it is advantageous for the displacement of the clamping element to be limited by an adjustable stop means. Through appropriate adjustment of the stop means, a displacement of the clamping element by an amount at which the tapering clamping face and the clamping element could be guided axially past one another can be prevented. The stop means therefore enables the thermostat top part to be secured against theft.

It is then possible to ensure that the retaining ring can be joined to the base foot by a directional locking means which comprises a pawl engaging under spring force between teeth at the circumference of one of the parts joined by the directional locking means, which pawl prevents the retaining ring rotating relative to the base foot in the engaged state to remove the thermostat top part, and for removing the thermostat top part can be disengaged from the teeth only by means of a tool. This directional locking means can be provided as an (optionally additional) dismantling deterrent against theft.

In detail, it is advantageous for the pawl to be guided in a radially displaceable manner at an aperture in the retaining ring and in the vicinity of the radially outer opening edge of the aperture for it to be provided with a substantially axial indentation for the engagement of one end of a lever-like tool, the pivot point of which forms the outer opening edge of the aperture, and for the teeth to be formed at the circumference of the base foot. In this embodiment, the pawl can be disengaged relatively simply from the teeth, in order to be able to rotate the retaining ring in the direction required for removal and to be able to exchange the thermostat top part. Dismantling for the uninitiated is difficult.

It is moreover an advantage for the slide member to have a locking arm with a locking projection capable of being locked in the engaged position of the slide member into one of two holes formed in the wall of the aperture and in the disengaged position of the slide member into the other of the two holes. In this manner, the slide member is confined to its engaged or disengaged state without itself escaping from the aperture when the thermostat top part is not properly positioned or when the slide member is disengaged.

Figure 2:
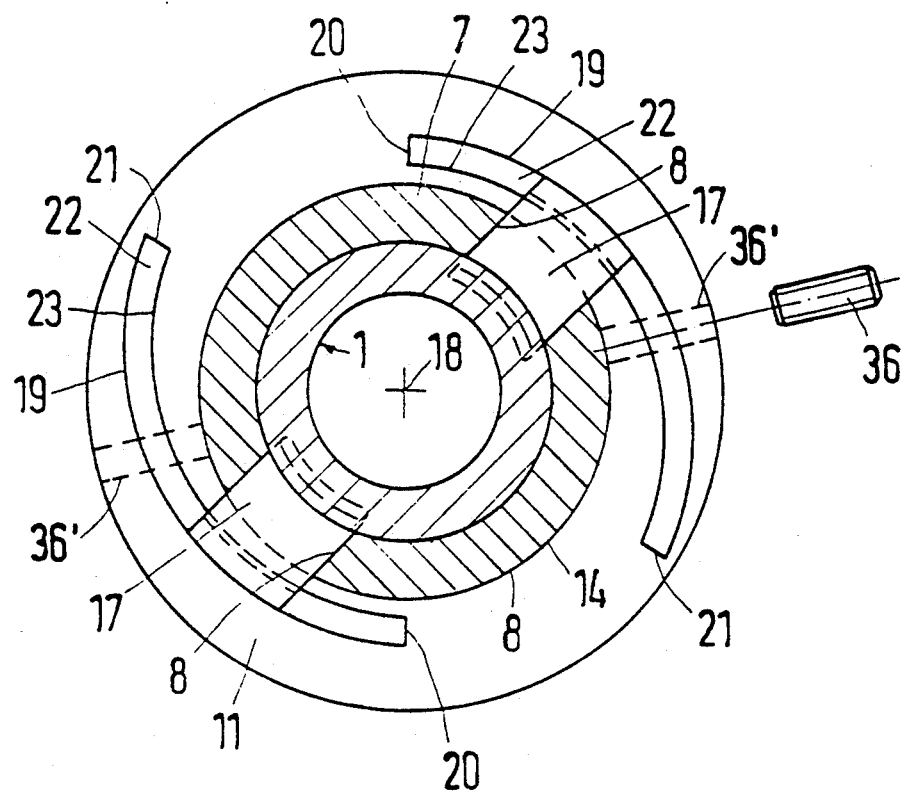
Figure 3:
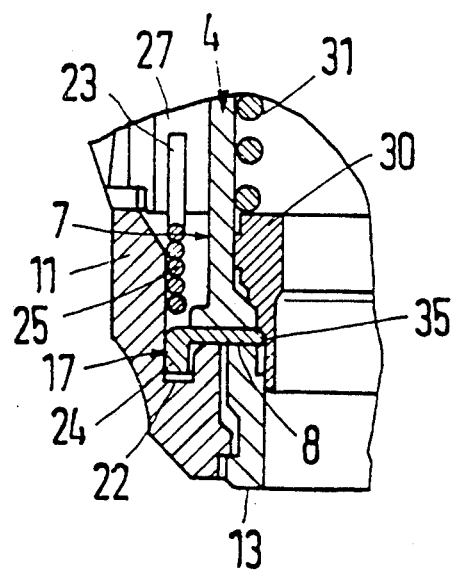
Figure 4:
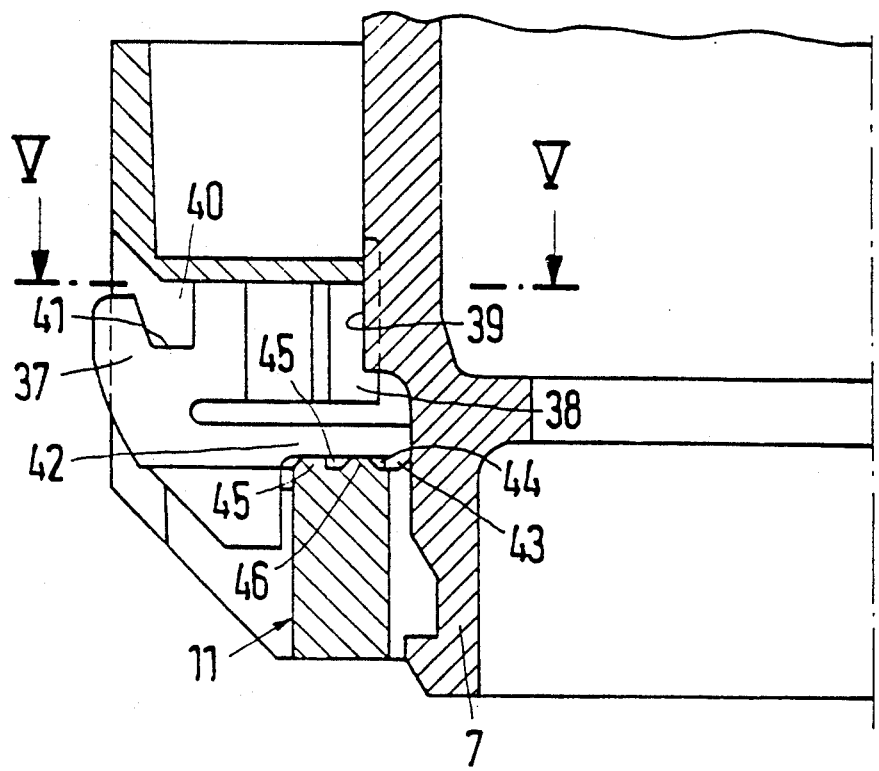

The invention and its developments are described in detail below with reference to the drawing of a preferred embodiment, in which FIG. 1 shows a side view of a thermostatic valve according to the invention, partially in section, FIG. 2 shows a part of the section A—A of FIG. 1, FIG. 3 shows a fragmentary view of FIG. 1 with the clamping element disengaged prior to the thermostat top part being placed on the valve housing, FIG. 4 shows an enlarged fragmentary view of an axial section of a modification of the thermostatic valve shown in FIGS. 1 to 3, and FIG. 5 shows the axial section V—V of FIG. 4.

The thermostatic valve illustrated has a valve housing 1 and a thermostat top part 2. A pin 3 actuating the valve shaft is guided out of the valve housing 1 to the outside.

The thermostat top part 2 has a fixed base 4 and a rotary knob 5, which encloses a thermostatic working element in the customary manner and contains an adjusting means. Depending on the temperature and the desired value setting, an actuator 6 is capable of shifting to actuate the pin 3 and thus the closure member of the valve.

The base 4 has a base foot 7 which is provided with radial holes and at its circumference with a groove 10; a retaining ring 11 that surrounds the base foot 7 has four lugs 12 projecting at its inside and can be snapped into the groove 10 by being pushed on axially since the base foot 7 and the base 4 are made of resiliently flexible plastics material.

The base 4 and base foot 7 are hollow-cylindrical, so that the thermostat top part 2, together with the retaining ring 11 that is rotatable relative to the base foot 7, can be pushed onto the valve housing 1 until the end face 13 of the base foot 7 engages an abutment face 14 of the valve housing 1 formed by a shoulder of the valve housing 1.

The valve housing 1 is provided with a circumferential retaining rib 15, the flanks of which are tapered. One flank serves as the clamping face 16 and co-operates with two adjustable clamping elements 17 that are radially adjustable to bear against the clamping face 16 and create a clamping force between the end face 13 and the abutment face 14. The clamping elements 17 project right through the holes 8. The retaining ring 11 has two guide faces 19 surrounding its centre line 18 for a part of its circumference, the spacing of which guide faces from the centre line 18 increases from one end 20 (FIG. 2) to the other end 21 of the respective guide face 19, these ends 20 and 21 in each case lying in a radial plane of the retaining ring 11. The clamping elements 17 each bear against one of the guide faces 19, and when the retaining ring 11 is rotated can be radially displaced to bear against the relevant guide face 19. Each guide face 19 defines a guide groove 22 which has a second guide face 23 parallel to the relevant guide face 19. The guide grooves 22 are formed in an end face of the retaining ring 11 and the clamping elements 17 engage with a respective lateral projection 24 into each of the guide grooves 22.

For the purpose of disconnecting the clamping elements 17 from the clamping face 16, the retaining ring 11 is rotatable against the force of a spring 25, here a torsion spring, which surrounds the base foot 7. The spring 25 is secured at one end 26 to the base foot 7 through engagement in a bore 27 of the base 4, and at its other end 28 is secured to the retaining ring 11 through engagement in a recess 29 on the inside of the retaining ring.

Inside the base foot 7, the valve housing 1 is surrounded by a locking ring 30, which is mounted so as to be axially displaceable; as the base foot 7 is pushed onto the valve housing 1, this locking ring is displaceable axially against the force of a second spring 31 from the end position illustrated in FIG. 3, in which the clamping elements 17 are lying on the circumference of the locking ring 30, and the thermostat top part 2 is disconnected from the valve housing 1, into the end position illustrated in FIG. 1, in which the thermostat top part 2 is coupled to the valve housing 1 and lies outside the path of movement of the clamping elements 17.

Because each of the clamping elements 17 passes through one of the holes 8, on rotation of the retaining ring 11 they cannot be turned by the retaining ring 11 in the circumferential direction. They are in the form, for example, of a plate, one edge of which is angled to form the projection 24. The clamping elements 17 are therefore also incapable of swivelling about an axis parallel to the centre line 18.

The spring 31 bears at one end against the edge of the locking ring 30 facing the rotary knob 5, and at the other end against a fixed ring 32. The locking ring 30 furthermore has radially inwardly projecting projections 33.

Before the thermostat top part 2 is coupled to the valve housing 1, the retaining ring 11 is rotated relative to the base foot 7 under the bias of the spring 25 to such an extent that the clamping elements 17 lie at the ends 21 of the guide grooves 22. In this position the clamping elements 17 are displaced radially outwards to such an extent that the spring 31 is able to push the locking ring 30 into the path of movement of the clamping elements 17, as illustrated in FIG. 3.

In the locked position of the clamping elements 17 shown in FIG. 3, the thermostat top part 2 can then be pushed onto the valve housing 1 without the clamping elements 17 first coming into contact with the retaining rib 15. As the thermostat top part 2 is pushed onto the valve housing 1, the projections 33 finally position themselves on a radial shoulder face 34 of the valve housing 1, so that as the thermostat top part 2 is, against the force of the spring 31, pushed on further, the locking ring 30 moves past the radially inwardly projecting ends 35 of the clamping elements 17 out of the path of movement of the clamping elements. The spring 25 thereupon causes the retaining ring 11 to be rotated back (in a clockwise direction in FIG. 2), so that the clamping elements 17 are displaced radially inwards until they meet the tapering clamping face 16 and rest against that face under the bias of the spring 25, as illustrated in FIG. 1. By virtue of the taper of the clamping face 16, the thermostat top part 2 is then pressed with the end face 13 against the abutment face 14, which together act as reference faces. Any possible thermal deformation, whether of the material of the base foot 7 or of the valve housing 1, is continuously counterbalanced by the bias of the spring 25. It is also guaranteed that no excessive pressure force occurs between the clamping elements 17 and the tapering clamping face 16.

A modification of the embodiment illustrated can comprise, for example, the provision of a single guide groove with only one clamping element. Furthermore, it is possible to provide a single guide groove that extends, for instance, spirally for about 360° on the end face of the retaining ring 11; two clamping elements 17 lying 180° apart can then be provided. Moreover, instead of the guide grooves 22 illustrated, only one such guide groove having only the one guide face 19 needs to be provided; the guide groove would then be open in a radially inward direction and the respective clamping element would be pressed by a restoring spring against the guide face 19. If desired, the projections 24 of the clamping element could then be omitted, and projections extending in the circumferential direction of the clamping elements would be provided for the restoring spring to bear against. A further alternative can consist in each or the single guide groove being formed with an undercut on the radially inner side of the retaining ring 11, for example, with a T-shaped cross-section, behind which the respective clamping element 17 engages. If desired, each clamping element 17 can then also be formed with a T-shaped cross-section which is matched to the cross-section of the guide groove.

As shown in FIG. 2, the displacement of the clamping element or both clamping elements can be limited by an adjustable stop member 36 in the form of a locking screw. The locking screw is screwed into a radial threaded bore 36' which passes through the guide faces 19 and 23. Each clamping element 17 can be provided with its own stop member 36 with its own threaded bore 36'. When it is screwed in, the stop member 36 prevents the relevant clamping element 17 being displaced radially outwards beyond the circumference of the retaining rib 15. The stop member 36 is adjustable only by means of a special tool, so that in this manner the thermostat top part 2 is provided with an effective anti-theft device.

Figure 5:
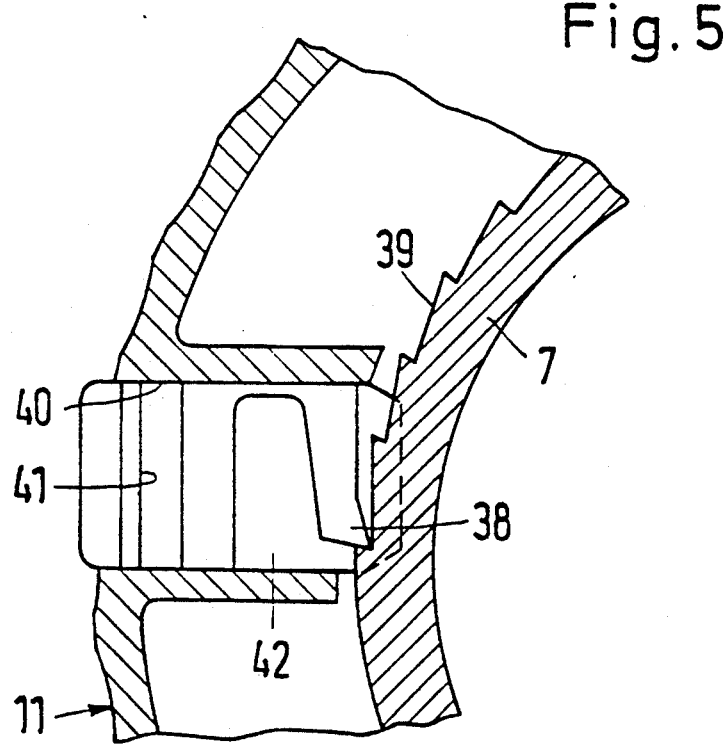

FIGS. 4 and 5 show a modification of the thermostatic valve shown in FIGS. 1 to 3, which consists of an additional or alternative anti-removal device for protection against theft in the form of a directional locking means. The locking means consists of a slide member 37 with an integrally formed resilient pawl 38 and teeth 39 on the outer circumference of the base foot 7. The slide member 37 is guided radially in a radial aperture 40 of the retaining ring 11 and in the vicinity of the radially outer opening edge of the aperture 40 is provided with a largely axial indentation 41 for the engagement of one end of a lever-like tool, for example a screw driver blade, the point of rotation of which forms the outer opening edge of the aperture 40. The slide member 37 has a locking arm 42 with a locking projection 43 which, in the engaged state of the slide member 37, in which the pawl 38 is able to engage with the teeth 39, can be locked into one (44) of two holes 44 and 45 formed in the wall of the opening 40 and in the disengaged state of the slide member 37 can be locked in the other of the two holes. The wall 46 between the holes 44 and 45 has a sloping flank both at the side of one hole 44 and at the side of the other hole 45. Furthermore, the wall defining the hole 45 with respect to the wall 46 has an axial flank and the locking projection 43 has a sloping face on its end face and a radial flank on its side remote from the end face.

In the engaged state of the slide member 37, in which the pawl 38 engages with the teeth 39, the directional locking means prevents the retaining ring 11 from being rotated relative to the base foot 7 in order to dismantle the thermostat top part 2, so that the directional locking means acts as an anti-removal device for protection against theft. In order despite this to be able to dismantle the thermostat top part for the purpose of exchanging it, a lever-like tool, for example a screw driver blade, can be inserted into the indentation 41 and pivoted about the outer opening edge of the aperture 40 as the pivot point so that the slide member 37 is displaced radially outwards and the pawl 38 becomes disengaged from the teeth 39. In this disconnected state of the slide member 37 the retaining ring 11 can be rotated anti-clockwise in FIG. 5, in order to move the clamping elements 17 radially outwards away from the tapering clamping face 16 and out of the path of movement of the locking ring 30, so that the thermostat top part 2 can be removed from the valve housing 1. On this displacement of the slide member 37, the locking arm 42 moves resiliently axially upwards in FIG. 4 owing to the locking projection 43 bearing on the one sloping flank of the wall 46, the locking projection 34 moving over the wall 46 and locking into the hole 45. Here, the axial faces of the locking projection 43 on the one hand and of the hole 45 on the other hand lie adjacent one another, so that the slide member 37 cannot be displaced further radially outwards. On displacement of the slide member 37 radially inwards, the locking projection 34 slides over the wall 46 again until it engages the hole 46 again. In this position the pawl 38 is also engaged with the teeth 39 again, so that it is not possible to rotate the retaining ring 11 in the dismantling direction.

We claim:

1. A thermostatic valve that has a central axis and includes a valve housing having an abutment face and a tapered clamping face, and a thermostat top part comprises a fixed base that has an axial hollow cylindrical base foot having an end face and is pushable axially onto the valve housing until the base foot end face engages the abutment face, the thermostat top part also having a retainer ring surrounding the base foot and being axially and rotatably secured to the base foot, the retaining ring being rotatable relative to the valve housing in a first angular direction and in an opposite second angular direction, at least one clamping element radially adjustable in the base foot for bearing against the clamping face and creating a clamping force between the end face and the abutment face, the retaining ring having a guide face bearing against the clamping element to radially move the clamp element away from the clamping face when the retainer ring is rotated in the first angular direction, the guide element extending arcuately at least partially around the central axis and having a first arcuate end and a second arcuate end lying in a radial plane, and being of increasing spacing relative to the central axis from the first arcuate end to the second arcuate end for displacing the clamping element radially away from the clamping face as the retainer ring is rotated in a first angular direction, first spring means acting between the retainer ring and the fixed base for constantly urging the retainer ring to rotate in the second angular direction, and a locking ring having a radial outer circumference surface, surrounding the valve housing and axially movable in the base foot from a first end position that the clamping element bears against radial outer circumferential surface of the locking ring and a second position out of the path of movement of the clamping element, and second spring means acting against the locking ring for constantly urging the locking ring to the first position.

2. A thermostatic valve according to claim 1, characterized in that the first spring means is a torsion spring having a first end secured to the base foot and an opposite end secured to the retainer ring.

3. A thermostatic valve according to claim 1, characterized in that there is provided stop means for limiting the radial adjustability of the clamping element.

4. A thermostatic valve according to claim 1, characterized in that the retainer ring has a guide groove providing the above guide face and a second guide face.

5. A thermostatic valve according to claim 4, characterized in that the retainer ring has an end face, that the groove is formed in the retainer ring end face and that the clamping element has a lateral projection extending into the groove.

6. A thermostatic valve according to claim 1, characterized in that one of the retainer ring and the base foot has circumferentially spaced teeth, that there is provided directional locking means for joining the retaining ring to the base foot, the locking means includes resilient pawl means for acting with a spring force between the teeth to prevent the retainer ring rotating relative to the base foot and blocking removal of the thermostat top part from the valve housing other than by use of a tool.

7. A thermostatic valve according to claim 6, characterized in that there is provided a pawl means mounting aperture, the pawl means comprises a slide member radially movable in the aperture between a locking position in engagement with the teeth to prevent rotation of the retainer ring in a direction permitting dismantling the thermostatic top part from the valve housing and an unlocking position out of engagement with the teeth.

8. A thermostatic valve according to claim 7, characterized in that the wall defining the aperture has axially spaced first and second holes, that the teeth are formed in the base foot, that the aperture is formed in retainer ring and has a radial outer opening edge, and a substantially axial indentation adjacent to the outer opening edge adapted for use as a pivot point of a lever like tool to move the slider to its release tool.

9. A thermostatic valve that has a central axis and includes a valve housing having a main body, an abutment face, and a clamping face that is tapered axially toward the abutment face and radially toward the central axis, and a thermostat top part that includes an axial hollow cylindrical base foot having an end face for abuttingly engaging the abutment face, a clamping element mounted by the base foot for radial movement between an outer thermostat top part removal, radial outer position and a radial inner position abutting against the clamping face to retain the base foot on the valve housing and press the base foot end face against the abutment face, the thermostat top part also having a retainer ring mounted to the base foot for rotational in a first angular direction to move the clamping element radially outwardly, a first spring having a first end connected to the retainer ring for resilient urging the retainer ring to rotate in a second angular direction that is opposite the first angular direction, a locking ring mounted by the base foot for axial movement relative thereto between a first axial position blocking movement of the clamping element from its radial outer position to its radial inner position and an axial outer position permitting the clamping element moving radially inwardly for abutting against the tapered clamping face, and a second spring for constantly resiliently urging the locking ring to its axial inner position.

10. A thermostatic valve according to claim 9 characterized in that the retainer ring has guide walls defining an arcuately curved groove that is of increasing radial spacing from the central axis in the first angular direction and that the clamping element has an axial projection extending into the groove for bearing against the guide walls.

11. A thermostatic valve according to claim 9, characterized in that there is stop means that is mounted by the retainer ring for retaining the clamping element in its radial inward position until removed therefrom by a tool.

* * * * *